(12) United States Patent
Suzuki et al.

(10) Patent No.: US 12,214,777 B2
(45) Date of Patent: Feb. 4, 2025

(54) PARKING ASSIST METHOD AND PARKING ASSIST DEVICE

(71) Applicant: Nissan Motor Co., Ltd., Yokohama (JP)

(72) Inventors: Yasuhiro Suzuki, Kanagawa (JP); Yusuke Musha, Kanagawa (JP); Ryota Yamanaka, Kanagawa (JP); Satoshi Muramatsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/578,758

(22) PCT Filed: Jul. 30, 2021

(86) PCT No.: PCT/JP2021/028509
§ 371 (c)(1),
(2) Date: Jan. 12, 2024

(87) PCT Pub. No.: WO2023/007749
PCT Pub. Date: Feb. 2, 2023

(65) Prior Publication Data
US 2024/0367642 A1    Nov. 7, 2024

(51) Int. Cl.
*B60W 30/06* (2006.01)
*B60W 50/08* (2020.01)

(52) U.S. Cl.
CPC ............ *B60W 30/06* (2013.01); *B60W 50/08* (2013.01)

(58) Field of Classification Search
CPC ............................... B60W 30/06; B60W 50/08
See application file for complete search history.

(56) References Cited

U.S. PATENT DOCUMENTS

| 2010/0049402 A1 | 2/2010 | Tanaka |
| 2013/0162829 A1* | 6/2013 | Kadowaki ................. B60R 1/27 348/148 |
| 2021/0107563 A1 | 4/2021 | Minase et al. |

FOREIGN PATENT DOCUMENTS

| CN | 1550378 A | 12/2004 |
| CN | 105163986 A | 12/2015 |

(Continued)

OTHER PUBLICATIONS

Translation of WO 2017072941 to Sato et al. (Sato) (Year: 2017).*

(Continued)

*Primary Examiner* — Kenneth J Malkowski
(74) *Attorney, Agent, or Firm* — Global IP Counselors, LLP (57) ABSTRACT

A parking assist method performs a parking assist control of a host vehicle based on a target travel path when a distance between a self-position and a target parking position is determined to be equal to or less than a first predetermined distance, a parking assist permission condition is satisfied, and a shift operation for switching direction has been detected. The parking assist permission condition is satisfied where either a condition in which a predetermined time or longer has elapsed since the host vehicle departed from the target parking position, or a condition in which the distance between the self-position and the target parking position since the host vehicle departed from the target parking position exceeds a second predetermined distance that is equal to or less than the first predetermined distance. The parking assist control is suppressed when the parking assist permission condition is not satisfied.

7 Claims, 5 Drawing Sheets

(56) References Cited

FOREIGN PATENT DOCUMENTS

| | | |
|---|---|---|
| CN | 111445722 A | 7/2020 |
| JP | 2001-106115 A | 4/2001 |
| JP | 2004-330891 A | 11/2004 |
| JP | 2021-95113 A | 6/2021 |
| WO | 2017/072941 A1 | 5/2017 |

OTHER PUBLICATIONS

Chinese Office Action of Jun. 15, 2024 of corresponding Chinese Patent Application No. 202180100739.8.
Extended European Search Report of Sep. 10, 2024 of corresponding European Patent Application No. 21951134.2.

* cited by examiner

PARKING ASSIST METHOD AND PARKING ASSIST DEVICE

CROSS-REFERENCE TO RELATED APPLICATIONS

This application is a U.S. national stage application of International Application No. PCT/JP2021/028509, filed on Jul. 30, 2021.

BACKGROUND

Technical Field

The present invention relates to a parking assist method and a parking assist device.

Background Information

International Patent Publication No. WO 2017/072941 (Patent Document 1) noted below describes a parking assist device that automatically starts parking assist when it is determined that a host vehicle is near a parking space.

SUMMARY

However, when parking assist is automatically started immediately after a host vehicle has departed from a parking space due to the host vehicle being near the parking space, parking assist unintended by a driver might be executed. An object of the present invention is to achieve both the convenience of automatically starting parking assist when the host vehicle approaches a parking space and the suppression of parking assist control unintended by the driver immediately after the host vehicle has departed from the parking space.

In the parking assist method according to one aspect of the present invention, it is determined whether a distance between a self-position, which is a current position of a host vehicle, and a target parking position is equal to or less than a first predetermined distance, it is determined whether a parking assist permission condition is satisfied, the parking assist permission condition being either a condition in which a predetermined time or longer has elapsed since the host vehicle departed from the target parking position, or a condition in which the distance between the self-position and the target parking position since the host vehicle departed from the target parking position exceeds a second predetermined distance that is equal to or less than the first predetermined distance, parking assist control of the host vehicle based on the target travel path is performed when the distance between the self-position and the target parking position is determined to be equal to or less than the first predetermined distance and the parking assist permission condition is satisfied, and the parking assist control is suppressed when the parking assist permission condition is not satisfied even when the distance between the self-position and the target parking position is equal to or less than the first predetermined distance.

According to the present invention, it is possible to both achieve convenience of automatically starting parking assist when the host vehicle approaches a parking space, and suppress parking assist control unintended by the driver immediately after departure from a parking space. The object and advantage of the present invention are realized and achieved using the elements indicated in the claims and combinations thereof. It should be understood that both the foregoing general description and the following detailed description are merely examples and explanations, and do not limit the invention set forth in the claims.

BRIEF DESCRIPTION OF THE DRAWINGS

Referring now to the attached drawings which form a part of this original disclosure:

FIG. 2(*a*) is an explanatory drawing of an example of a process for storing a feature learning position.

FIG. 2(*b*) is an explanatory drawing of an example of a process when parking assist is being performed.

DETAILED DESCRIPTION OF EMBODIMENTS

Figure 1:
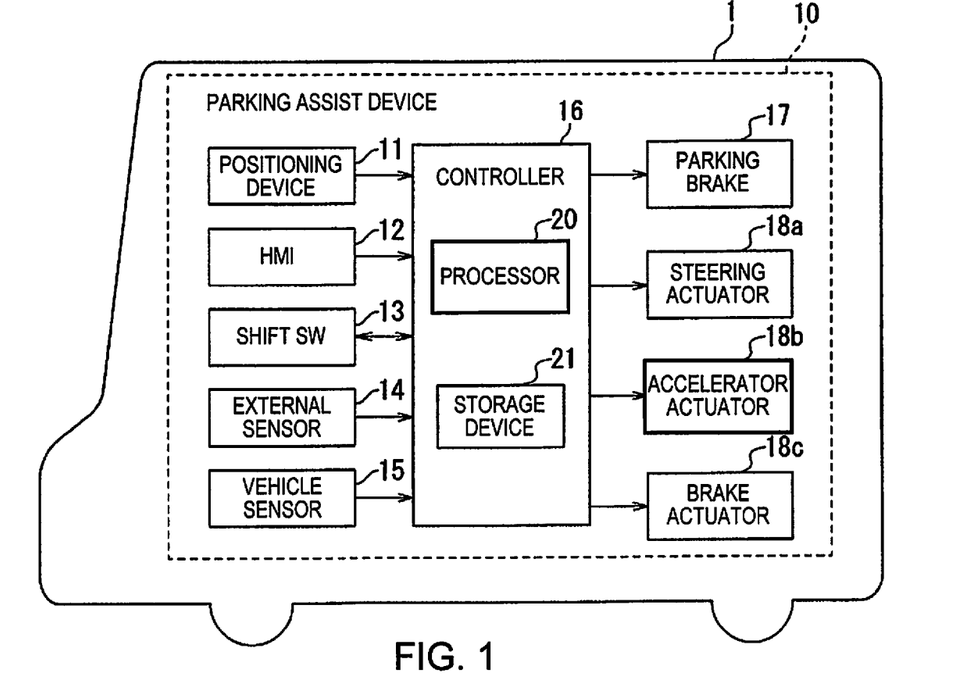
FIG. 1 is a drawing showing an example of the general configuration of a parking assist device of an embodiment.

Referring to FIG. 1, a host vehicle 1 is provided with a parking assist device 10 that assists with parking the host vehicle 1 in a target parking position. In the parking assist performed by the parking assist device 10, a target travel path from a current position of the host vehicle 1 to the target parking position is calculated. The host vehicle 1 is assisted in traveling along the target travel path. The parking assist performed by the parking assist device 10 includes various modes that assist the host vehicle 1 in traveling along the target travel path. For example, parking of the host vehicle 1 can be assisted by performing automatic driving that controls the host vehicle 1 so as to travel along the target travel path of the host vehicle 1 to the target parking position. Automatic driving that controls host vehicle 1 so as to travel to the target parking position along the target travel path of the host vehicle 1 means control of some or all of a steering angle, a drive force, and a brake force of the host vehicle to automatically perform some or all of the travel of the host vehicle 1 along the target travel path, and control that assists a parking operation by an occupant. Parking of the host vehicle 1 can be assisted by displaying the target travel path and the current position of the host vehicle 1 on a display device that can be viewed by an occupant of the host vehicle 1.

The parking assist device 10 includes a positioning device 11, a human-machine interface 12, a shift switch 13, an external sensor 14, a vehicle sensor 15, a controller 16, a parking brake 17, a steering actuator 18*a*, an accelerator actuator 18*b*, and a brake actuator 18*c*. In the drawings, the human-machine interface is notated as "HMI" and the shift switch is notated as "shift SW."

The positioning device 11 locates the current position of the host vehicle 1. The positioning device 11 can be provided with, e.g., a full global positioning system (GNSS) receiver. The GNSS receiver is, e.g., a global positioning system (GPS) receiver, and receives radio waves from a plurality of navigation satellites to locate the current position of the host vehicle 1. The human-machine interface 12 is an interface device via which information is exchanged between the parking assist device 10 and an occupant. The human-machine interface 12 is provided with a display device (e.g., a display screen of a navigation system) that can be viewed by an occupant of the host vehicle 1, or a speaker or buzzer for outputting a warning sound or notification sound, and voice information. The human-machine interface 12 is also provided with an operation element that receives an operation input from the occupant to the parking assist device 10. The operation element can be a button or switch, a lever, a dial, a keyboard, or other mechanical interface device, or can be a button or switch, a lever, a dial, a keyboard, or the like displayed on a touch panel.

The shift switch 13 is a switch for a driver or the parking assist device 10 to switch a shift position of the host vehicle 1. The external sensor 14 detects an object within a predetermined distance range (e.g., a detection area of the external sensor 14) from the host vehicle 1. The external sensor 14 detects a surrounding environment of the host vehicle 1 such as a relative position between the object present in the surroundings of the host vehicle 1 and the host vehicle 1, a distance between the host vehicle 1 and the object, and a direction in which the object is present. The external sensor 14 can include, e.g., a camera that captures the surrounding environment of the host vehicle 1. The camera can be an around view monitor camera that captures, e.g., a road surface around the host vehicle 1, and generates a captured image converted to a bird's eye view (around view monitor image). The external sensor 14 can include a laser range finder (LRF) or a radar, a LiDAR (Light Detection and Ranging) laser radar, or other distance measuring devices.

The vehicle sensor 15 detects various information (vehicle information) obtained from the host vehicle 1. The vehicle sensor 15 can include, e.g., a vehicle speed sensor that detects a travel speed (vehicle speed) of host vehicle 1, a wheel speed sensor that detects a rotational speed of each tire of the host vehicle 1, and a three-axis acceleration sensor (G sensor) that detects acceleration (including deceleration) of the host vehicle 1 in directions along three axes, a steering angle sensor that detects a steering angle (including the steering angle of a steering wheel or a turning angle of a turning wheel), a gyro sensor that detects an angular velocity generated in the host vehicle 1, and a yaw rate sensor that detects a yaw rate.

The controller 16 is an electronic control unit (ECU) that controls the parking assist of the host vehicle 1. The controller 16 includes a processor 20, and a storage device 21 or other peripheral components. The processor 20 can be, e.g., a central processing unit (CPU) or a micro-processing unit (MPU). The storage device 21 can be provided with a semiconductor storage device, or a magnetic storage device, optical storage device, or the like. The functions of the controller 16 described below are realized by, e.g., the processor 20 executing a computer program stored in the storage device 21. The controller 16 can be formed by dedicated hardware for executing each information process described below. The steering actuator 18a controls the steering direction and steering amount of the steering mechanism in accordance with a control signal from the controller 16. The accelerator actuator 18b controls the accelerator position of a driving device, which is an engine or driving motor, in accordance with a control signal from the controller 16. The brake actuator 18c actuates a braking device in accordance with a control signal from the controller 16.

Figure 2A:
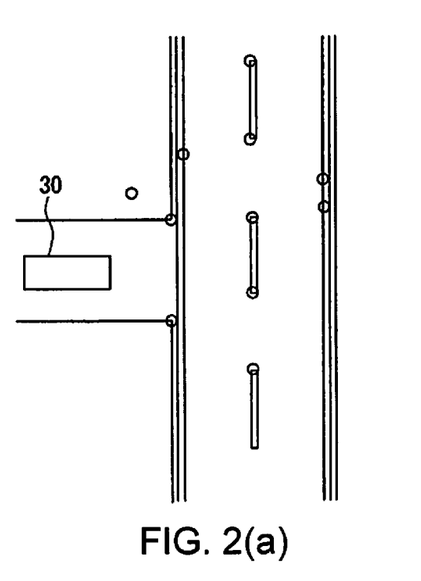

An example of the parking assist control performed by the parking assist device 10 of the embodiments is next described. Referring to FIG. 2(*a*), the driver stores, in the storage device 21, a position of a feature present in the vicinity of a target parking position 30, which is a target position for parking the host vehicle 1 when using the parking assist performed by the parking assist device 10. The feature is a ground object that serves as a mark for identifying the current position of the host vehicle 1, and includes road markings (road signs, lane markings, and road markings) drawn on the road surface around the host vehicle 1, or a road boundary, a curb, a guardrail, a utility pole, or other obstacles.

When the feature position is stored in the storage device 21, the driver, for example, operates a "parking position learning switch" prepared as an operation element of the human-machine interface 12. The host vehicle 1 is parked in the target parking position 30 by manual driving by the driver. The external sensor 14 detects the feature position, which is the position of a feature present in a detection area within a predetermined distance from the external sensor 14. For example, the parking assist device 10 detects, as a characteristic point, an image of portions representing road markings, road boundaries, and other features from images captured by a camera, which is the external sensor 14, and the position of the characteristic point can be used as the feature position. The parking assist device 10 also detects a characteristic amount of the detected characteristic point. For example, the characteristic point of point group information obtained by a laser range finder, a radar, or a LiDAR that serves as the external sensor 14, and their characteristic amounts (e.g., the density and attributes of the characteristic points) may be detected. Described in the present specification is an example of detecting a characteristic point from a captured image.

In FIG. 2(*a*), circle plots represent characteristic points detected in a capture area of the camera (i.e., feature position). The parking assist device 10 stores, in the storage device 21, a feature position (e.g., a characteristic point detected from an image captured by a camera, and the characteristic amount thereof) detected by the external sensor 14 while the driver manually parks the host vehicle 1 at the target parking position 30. Hereinbelow, the feature position stored in the storage device 21 may be referred to as "feature learning position."

The parking assist device 10 stores a relative positional relationship between the feature learning position and the target parking position 30. For example, the driver can operate the human-machine interface 12 to input to the parking assist device 10 that the current position of the host vehicle 1 is the target parking position 30. The parking assist device 10 can obtain the relative positional relationship between the feature learning position and the target parking position 30 on the basis of the feature position detected by the external sensor 14 when the host vehicle 1 is positioned in the target parking position 30.

For example, the image captured by the camera serving as the external sensor 14 is displayed on the display device of the human-machine interface 12, and the driver can specify the position of the target parking position 30 on the captured image. The parking assist device 10 can obtain the relative positional relationship between the feature learning position and the target parking position 30 on the basis of the specified target parking position 30 and the feature position shown in the captured image. When the relative positional relationship between the feature learning position and the target parking position 30 is to be stored in the storage device 21, each feature learning position and the position of the target parking position 30 can be stored as coordinates on a coordinate system (hereinbelow referred to as "map coordinate system") in which a fixed geographical point is used as a reference point. These relative positional relationships can be obtained from the difference in the coordinates of the feature learning position and the target parking position 30 in a shared map coordinate system. When the coordinates on the map coordinate system are stored as the feature learning position, the current position on the map coordinate system located by the positioning device 11 when the host vehicle 1 is positioned in the target parking position 30 can be stored as the target parking position 30. Also, instead of a map coordinate system, it is possible to store the relative position of each target parking position 30 with respect to each feature learning position.

Figure 2B:
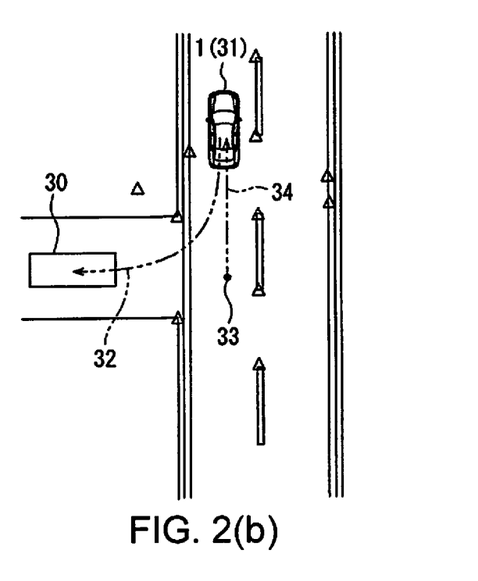

When the feature learning position and the position of the target parking position 30 are stored in the storage device 21, it is possible to use parking assist performed by the parking assist device 10. Referring to FIG. 2(b), the parking assist device 10 determines whether the distance between the host vehicle 1 and the target parking position is equal to or less than a first predetermined distance. Furthermore, the parking assist device 10 determines whether the driver has performed a shift operation for switching direction by switching the host vehicle 1 between forward and reverse. FIG. 2(b) shows an example in which the host vehicle switches direction from a cut back position 31. The term "cut back" can include both the case of switching direction from forward to reverse and the case of switching direction from reverse to forward. The parking assist device 10 can determine that a shift operation for switching direction has been performed when the shift position has been switched from a drive range (hereinafter referred to as "D range") to a reverse range (hereinafter referred to as "R range") or when the shift position has been switched from the R range to the D range.

The parking assist device 10 determines whether the driver has operated a "parking assist startup switch" prepared as an operation element of the human-machine interface 12. The parking assist device 10 automatically performs parking assist when the distance between the host vehicle 1 and the target parking position 30 is equal to or less than the first predetermined distance and a shift operation for switching direction is performed. The first predetermined distance is any distance determined in advance, and is a distance set, as appropriate, in terms of design. The parking assist device 10 performs driving assistance of the host vehicle 1 when the distance between the host vehicle 1 and the target parking position 30 is equal to or less than the first predetermined distance and the parking assist startup switch is operated. In the present embodiment, an example is described in which driving assistance of the host vehicle 1 is performed when the distance between the host vehicle 1 and the target parking position 30 is equal to or less than the first predetermined distance, and the shift operation for switching direction or the parking support startup switch operation has been performed. However, the conditions for performing driving assistance are not limited thereto. For example, the driving assistance of the host vehicle 1 can be performed when the distance between the host vehicle 1 and the target parking position 30 is equal to or less than the first predetermined distance and a hazard lamp is has been turned on, or when the distance between the host vehicle 1 and the target parking position 30 is equal to or less than the first predetermined distance and the vehicle has stopped. In other words, the driving assistance of the host vehicle 1 can be performed when a predetermined condition holds true, including the distance between the host vehicle 1 and the target parking position 30 being equal to or less than the first predetermined distance. In such instances, the external sensor 14 detects a feature position, which is the position of a feature present in the detection area of the external sensor 14. The feature position detected by the external sensor 14 during performance of driving assistance is indicated by a triangle plot. Detection of the feature position by the external sensor 14 can be performed at all times regardless of operation of the shift operation or the parking assist startup switch, and the timing for detecting the feature position by the external sensor 14 is not limited.

The parking assist device 10 matches each feature position (triangle plot) detected by the external sensor 14 and the feature learning positions (circle plot in FIG. 2(a)) stored in the storage device 21, and associates mutual feature positions that have been detected for the same feature. The parking assist device 10 calculates the relative positional relationship between the current position of the host vehicle 1 and the target parking position 30 on the basis of the relative positional relationship between each feature position (triangle plots) detected by the external sensor 14 and the host vehicle 1, and the relative positional relationship between the feature learning positions (circle plots) associated with these feature positions (triangle plots) and the target parking position 30. For example, the parking assist device 10 can calculate the position of the target parking position 30 on a coordinate system (hereinbelow referred to as "vehicle coordinate system") that uses the current position of the host vehicle 1 as a reference. For example, when the coordinates of the feature learning positions (circle plots) and the target parking position 30 in the map coordinate system are stored in the storage device 21, the target parking position 30 on the map coordinate system can be converted to the target parking position 30 on the vehicle coordinate system on the basis of the feature positions (triangle plots) in the vehicle coordinate system detected during performance of driving assistance and the feature learning positions (circle plots) in the map coordinate system. Alternatively, the current position of the host vehicle 1 on the map coordinate system can be obtained on the basis of the feature positions (triangle plots) in the vehicle coordinate system detected during performance of parking assist and the feature learning positions (circle plots) in the map coordinate system, and the relative positional relationship between the current position of the host vehicle 1 and the target parking position 30 can be calculated from the difference between the coordinates of the host vehicle 1 and the coordinates of the target parking position 30 on the map coordinate system. The parking assist device 10 calculates the target travel path from the current position of the host vehicle 1 to the target parking position 30 via the cut back position 31 based on of the relative positional relationship between the current position of the host vehicle 1 and the target parking position 30.

A path 32 from the cut back position 31 to the target parking position 30 is calculated as the target travel path when, e.g., the position of the host vehicle 1 at the time when the parking assist has started is the cut back position 31. For example, when the position of the host vehicle 1 at the time that parking assist started by operation of the parking assist startup switch is a position 33 near the target parking position 30, a path 34 that advances from the position 33 to the cut back position 31 and the path 32 from the cut back position 31 to the target parking position 30 are calculated as the target travel path. In other words, "the target travel path to the target parking position via the cut back position" includes both the target travel path 32 starting from the cut back position 31 and ending at the target parking position 30, and the target travel paths 34, 32 progressing from the position 33 to the cut back position 31 and switching direction at the cut back position 31 to arrive at the target parking position 30. The parking assist device 10 performs parking assist control of the host vehicle 1 on the basis of the calculated target travel path. As the parking assist control of the host vehicle 1, the host vehicle 1 can be controlled (automatic driving) so as to travel along the calculated target travel path, and the target travel path can be displayed on a display device of the human-machine interface 12.

Figure 3:
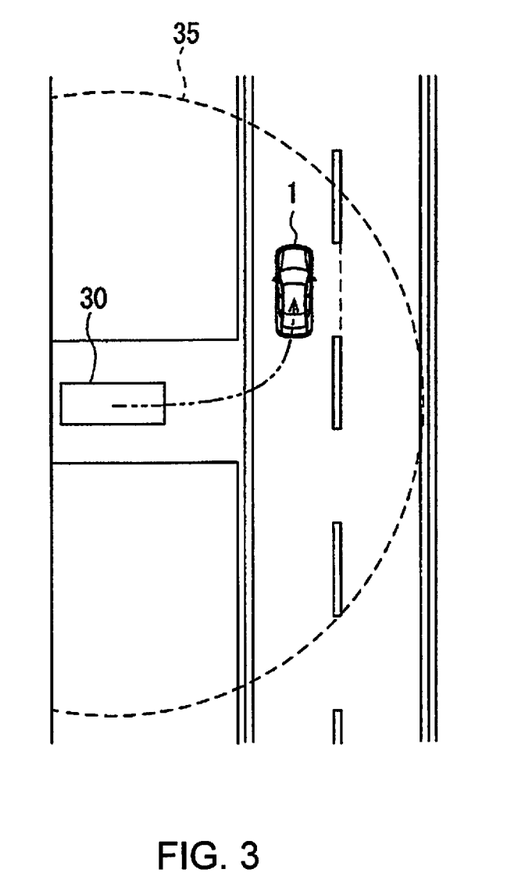
FIG. 3 is an explanatory drawing of an example of the parking assist method of an embodiment.

Thus, when parking assist is automatically performed when the distance between the host vehicle 1 and the target parking position 30 is equal to or less than the first predetermined distance, parking assist unintended by the driver may start due to the distance between the host vehicle 1 and the target parking position 30 immediately after departure being equal to or less than the first predetermined distance when the vehicle has departed from the target parking position 30. In view of the foregoing, when the parking assist device 10 detects that the host vehicle 1 has departed from the target parking position 30, as shown in FIG. 3, parking assist control is suppressed until the host vehicle 1 has exceeded a range 35 of the second predetermined distance, which is a predetermined distance set in advance to equal to or less than the first predetermined distance, from the target parking position 30, or until a predetermined time set in advance has elapsed since departure. The second predetermined distance is any distance determined in advance in the same manner as the first predetermined distance, and is a distance set, as appropriate, for design purposes. The predetermined time set in advance is an arbitrary time, and is a time set, as appropriate, for design purposes. The predetermined time set in advance is preferably set with consideration given to the time required for the host vehicle 1 to travel the second predetermined distance after having departed from the target parking position 30. It is thereby possible to both achieve convenience of automatically starting parking assist when the host vehicle approaches a parking space, and suppress parking assist control unintended by the driver immediately after departure from a parking space.

Figure 4:
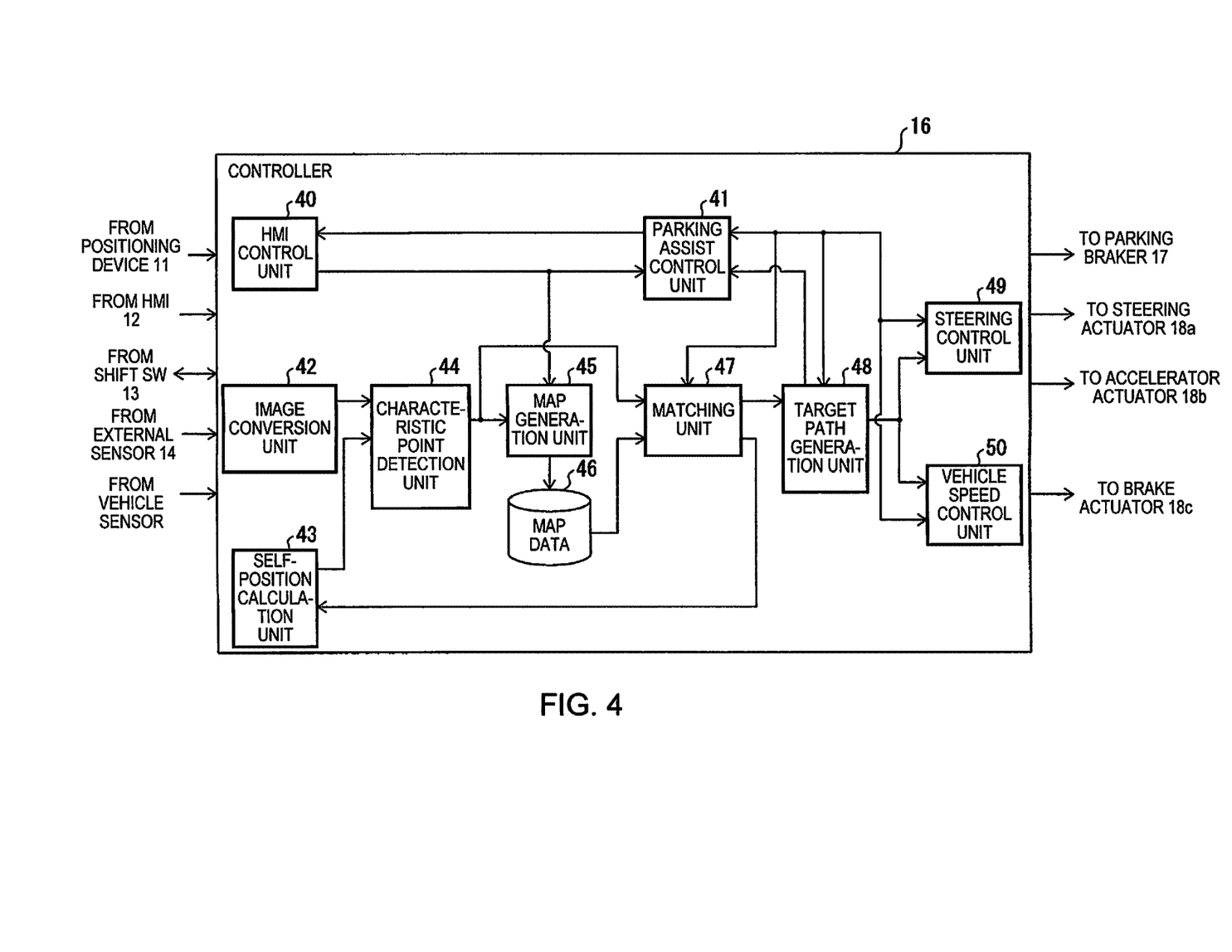
FIG. 4 is a block diagram of an example of a functional configuration of a controller in FIG. 1.

The functional configuration of the controller 16 is explained in greater detail below. Referring to FIG. 4, the controller 16 functions as a human-machine interface control unit (hereinbelow referred to as "HMI control unit") 40, a parking assist control unit 41, an image conversion unit 42, a self-position calculation unit 43, a characteristic point detection unit 44, a map generation unit 45, a matching unit 47, a target path generation unit 48, a steering control unit 49, and a vehicle speed control unit 50. When the parking position learning switch of the human-machine interface 12 has been operated by the driver, the HMI control unit 40 outputs, to the map generation unit 45, a map generation instruction for causing the feature learning position to be stored in the storage device 21. The HMI control unit 40 determines whether the driver has performed a shift operation for switching direction, and outputs the determination result to the parking assist control unit 41. The detection result is also outputted to the parking assist control unit 41 when it has been detected that the parking assist startup switch of the human-machine interface 12 has been operated by the driver.

The parking assist control unit 41 determines whether the distance between the host vehicle 1 and the target parking position 30 is equal to or less than the first predetermined distance. For example, the parking assist control unit 41 can determine whether the distance between the host vehicle 1 and the target parking position 30 is equal to or less than the first predetermined distance on the basis of the current position of the host vehicle 1 located by the positioning device 11. For example, the characteristic amount of a feature in the vicinity of the target parking position 30 is stored in advance, and it is also possible to determine whether the distance between the host vehicle 1 and the target parking position 30 is equal to or less than the first predetermined distance on the basis of whether the external sensor 14 detects a feature having a similar characteristic amount. When the detection range of the external sensor 14 is the range of the first predetermined distance from the host vehicle and a characteristic amount similar to the feature in the vicinity of the target parking position 30 has been detected, the distance between the host vehicle 1 and the target parking position 30 can be determined to be equal to or less than the first predetermined distance.

When the distance between the host vehicle 1 and the target parking position 30 is equal to or less than the first predetermined distance and a shift operation for switching direction has been detected, the parking assist control unit 41 determines whether a predetermined parking assist permission condition is satisfied. The parking assist permission condition can be, e.g., a condition in which a predetermined time or longer has elapsed since the host vehicle 1 departed the target parking position 30. In lieu thereof or in addition thereto, the parking assist permission condition can be a condition in which the distance between the current position of the host vehicle 1 and the target parking position 30 since the departure of the host vehicle 1 from the target parking position 30 has exceeded the second predetermined distance, which is equal to or less than the first predetermined distance. When the parking assist permission condition is satisfied, the parking assist control unit 41 starts the parking assist control. The parking assist control unit 41 also starts the parking assist control when the distance between the host vehicle 1 and the target parking position 30 is equal to or less than the first predetermined distance and the HMI control unit 40 detects operation of the parking assist startup switch. The present embodiment shows an example in which the parking assist control unit 41 starts the parking assist control when the HMI control unit 40 detects operation of the parking assist startup switch, but such a configuration is not provided by way of limitation. For example, as when a shift operation has been detected, it is determined whether a predetermined parking assist permission condition is satisfied when operation of the parking assist startup switch has been detected, and when the parking assist permission condition is satisfied, the parking assist control unit 41 can start the parking assist control. The parking assist control unit 41 can also start the parking assist control when only one of the shift operation and operation of the parking assist startup switch is detected, and the parking assist permission condition is satisfied.

The parking assist control unit 41 outputs, to the matching unit 47, a parking position calculation instruction for calculating the position of target parking position 30 in the vehicle coordinate system. A travel path calculation instruction for causing a target travel path from the current position of the host vehicle 1 to the target parking position 30, and a target vehicle speed profile in which the host vehicle 1 will travel along the target travel path to be calculated on the basis of the calculated position of the target parking position 30 is outputted to the target path generation unit 48. The target path generation unit 48 calculates the target travel path from the current position of the host vehicle 1 to the target parking position 30 and the target vehicle speed profile, and outputs the results to the parking assist control unit 41. Well-known methods used in automatic parking commonly known devices can be used for calculating the target travel path from the current position of the host vehicle 1 to the target parking position 30, and as an example, it is possible to perform the calculation by connecting a clothoid curve from the current position of the host vehicle 1 to the target parking position 30 by way of the cut back position 31. As an example of the target vehicle speed profile, it is possible to use, as a basis, a predetermined set speed set in advance to calculate a vehicle speed profile in which the host vehicle 1 has accelerated from its current position to a set speed, then decelerated just prior to the cut back position 31 and stopped at the cut back position 31, accelerated from the cut back position 31 to the set speed, decelerated just prior to the target parking position 30, and stopped at the target parking position 30. Alternatively, it is also possible to set the set speed when calculating the speed profile so that the speed is slower in commensurate fashion to a higher curvature on the basis of the curvature of the calculated target travel path.

The parking assist control unit 41 outputs the target travel path calculated by the target path generation unit 48 and information about the current position of the host vehicle 1 to the HMI control unit 40. Information about the cut back position 31 is outputted to the HMI control unit 40 when the calculated target travel path includes switching direction, such as paths 32 and 34 in FIG. 2(*b*). The HMI control unit 40 displays the target travel path, the current position of the host vehicle 1, and the cut back position on a display device of the human-machine interface 12. The parking assist control unit 41 outputs, to the steering control unit 49, a steering control instruction for performing steering and control so as to cause the host vehicle 1 to travel along the calculated target travel path. A vehicle speed control instruction for controlling the vehicle speed of the host vehicle 1 along the calculated temperature vehicle speed profile is outputted to the vehicle speed control unit 50.

When the parking assist permission condition is not satisfied, the parking assist control unit 41 suppresses the parking assist control. For example, the parking assist control unit 41 prohibits the parking assist control. For example, the parking assist control unit 41 can stop output of the above-described parking position calculation instruction, target travel calculation instruction, steering control instruction, and vehicle speed control instruction. Parking assist that controls the host vehicle 1 is thereby prohibited so that the host vehicle travels along the target travel path to the target parking position. Alternatively, driving assistance that displays the target travel path and the current position of the host vehicle 1 on the display device can be prohibited. The parking assist control unit 41 can suppress the parking assist control by limiting the speed of the host vehicle 1 controlled by the vehicle speed control unit 50 so as to be lower than the calculated target vehicle speed profile. For example, the parking assist control unit 41 can output, to the vehicle speed control unit 50, a vehicle speed control instruction that reduces the speed of the host vehicle 1 to less than that of the target vehicle speed profile. Alternatively, the maximum speed in the calculated target vehicle speed profile can be limited to a speed that is lower than a predetermined set speed, and a vehicle speed control instruction based on the target vehicle speed profile in which the maximum speed is limited can be outputted to the vehicle speed control unit 50. In other words, when the parking assist permission condition is not satisfied, the moving speed (vehicle speed) of the host vehicle 1 when traveling to the target parking position can be reduced to less than when the parking assist permission condition has been satisfied.

The image conversion unit 42 converts an image captured by the camera of the external sensor 14 into a bird's eye view image (around view monitor image) as seen from a virtual viewpoint directly above the host vehicle 1, such as in FIGS. 2(*a*) and 2(*b*). Hereinbelow, the bird's eye view image converted by the image conversion unit 42 may be referred to as "periphery image." FIG. 2(*a*) a periphery image for when a feature learning position is stored in the storage device 21, and FIG. 2(*b*) is a periphery for when parking assist control is performed.

The image conversion unit 42 generates a periphery image at predetermined intervals. For example, the image conversion unit 42 can generate a periphery image each time the host vehicle 1 travels a predetermined distance (e.g., 50 cm). Also, for example, a periphery image can be generated each time the host vehicle travels a predetermined time (e.g., 1 second). Thus, each peripheral image acquired when the host vehicle 1 is in a different position, and each periphery image acquired at different times may be referred to as a "frame."

The self-position calculation unit 43 computes the current position of the host vehicle 1 on the map coordinate system by dead-reckoning based on vehicle information outputted from the vehicle sensor 15. The characteristic point detection unit 44 performs predetermined preprocessing such as noise removal, brightness adjustment, and edge enhancement on the periphery image outputted from the image conversion unit 42. The characteristic point detection unit 44 detects characteristic points and characteristic amounts thereof from the periphery image which has been subjected to preprocessing. For example, the characteristic point detection unit 44 can detect the characteristic points and characteristic amounts using a FAST detector or a FREAK descriptor. The characteristic points detected when the feature learning position is stored in the storage device 21 are indicated as circle plots in FIG. 2(*a*). The characteristic points detected when the parking assist control is performed are indicated as triangle plots in FIG. 2(*b*). Furthermore, the characteristic point detection unit 44 extracts shared characteristic points shared in two different frames. Extracting shared characteristic points makes it possible to remove characteristic points resulting from detection of three-dimensional objects, raindrops, vehicle shadows, and moving objects. The characteristic point detection unit 44 synchronizes the characteristic points extracted as shared characteristic points and the current position of the host vehicle 1 received from the self-position calculation unit 43 when the periphery image was acquired, and outputs the result to the map generation unit 45 and the matching unit 47.

Referring to FIG. 4, when the feature learning position is to be stored in the storage device 21, the driver operates the parking position learning switch and parks the host vehicle 1 in the target parking position by manual driving. At this time, the map generation unit 45 receives a map generation instruction from the HMI control unit 40. Upon receiving the map generation instruction, the map generation unit 45 stores characteristic point information, which includes the characteristic points outputted from the characteristic point detection unit 44, the current position of the host vehicle 1 synchronized therewith, and the characteristic amounts of the characteristic points, in the storage device 21 as the feature learning position and generates map data 46. The positions of the characteristic points on the map coordinate system can be calculated and stored as characteristic point information on the basis of the current position of the host vehicle 1 synchronized with the characteristic points. When the driver operates the human-machine interface 12 and inputs the current position of the host vehicle 1 as the target parking position 30 to the parking assist device 10, the map generation unit 45 receives the current position of the host vehicle 1 on the map coordinate system from the positioning device 11 or the self-position calculation unit 43 and stores the received position in the map data 46 as the target parking position 30. In other words, the relative positional relationship between the target parking position 30 and the plurality of characteristic points is stored as map data.

When the parking assist control unit 41 thereafter starts the parking assist control, the matching unit 47 receives the parking position calculation instruction from the parking assist control unit 41. Upon receiving the parking position calculation instruction, the matching unit 47 matches the characteristic point information (circle plots in FIG. 2(a)) stored as feature learning positions in the map data 46 and the characteristic point information (triangle plots of FIG. 2(b)) from the captured image outputted by the camera of the external sensor 14 during performance of parking assist and outputted from the characteristic point detection unit 44, and associates the pieces of characteristic point information detected for the same feature. At this time, the matching unit 47 can remove, as outlier values, characteristic points that do not match a 2D affine transformation among mutually associated characteristic points. Outlier values can be detected using, e.g., random sample consensus (RANSAC). Characteristic points that do not have matching characteristic amounts such as shading and attributes can be removed among the mutually associated characteristic points.

The matching unit 47 calculates the relative positional relationship between the current position of the host vehicle 1 and the target parking position 30 on the basis of the relative positional relationship between the characteristic points (triangle plots) during performance of parking assist and the host vehicle 1, and the relative positional relationship between the characteristic points (circle plots) of the map data 46 associated with the characteristic points (triangle plots) during performance of parking assist and the target parking position 30. For example, a characteristic point detected during performance of parking assist is notated as $(x_i, y_i)$, and a characteristic point associated with the characteristic point $(x_i, y_i)$ and stored as a feature learning position in the map data 46 is notated as $(x_{mi}, y_{mi})$ (where i=1 to N). The matching unit 47 calculates an affine transformation matrix $M_{affine}$ using the following formula on the basis of the least squares method.

$$\begin{bmatrix} a_1 \\ a_2 \\ a_3 \\ a_4 \end{bmatrix} = [X_X^T \ X_X]^{-1} X_X^T X_{tfm} \text{ where}$$

Formula 1

$$X_x = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix} X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

A column vector $(a_1, a_2, a_3, a_4)^T$ can be calculated as in the following formula using a weighted least squares method.

$$W = \text{diag}(w_1 \ \ldots \ w_N)$$

Formula 2

$$\begin{bmatrix} a_1 \\ a_2 \\ a_3 \\ a_4 \end{bmatrix} = [X_X^T \ W \ X_X]^{-1} X_X^T W \ X_{tfm}$$

The matching unit 47 converts the position (targetx$_m$, targety$_m$) of the target parking position 30 on the map coordinate system stored in the map data 46 to the position (targetx, targety) of the vehicle coordinate system using the following formula.

$$\begin{Bmatrix} targetx \\ targety \end{Bmatrix} = M_{affine} \begin{Bmatrix} targetx_m \\ targety_m \\ 1 \end{Bmatrix}$$

Formula 3

Upon receiving the travel path calculation instruction from the parking assist control unit 41, the target path generation unit 48 calculates the target travel path from the current position (i.e., the coordinate origin) of the host vehicle 1 on the vehicle coordinate system to the target parking position 30 (targetx, targety), and the target vehicle speed profile in which the host vehicle 1 travels along the target travel path. Upon receiving the steering control instruction from the parking assist control unit 41, the steering control unit 49 controls the steering actuator 18a such that the host vehicle 1 travels along the target travel path. Upon receiving the vehicle speed control instruction from the parking assist control unit 41, the vehicle speed control unit 50 controls the accelerator actuator 18b and the brake actuator 18c such that the vehicle speed of the host vehicle 1 changes in accordance with the target vehicle speed profile. The host vehicle 1 is thereby controlled so as to travel along the target travel path.

The parking assist control unit 41 determines whether the host vehicle 1 has arrived at the target parking position 30 and parking assist control has been completed. When the parking assist control is completed, the parking assist control unit 41 operates the parking brake 17 and switches the shift position to a parking range (hereinbelow referred to as "P range").

Operation

Figure 5:
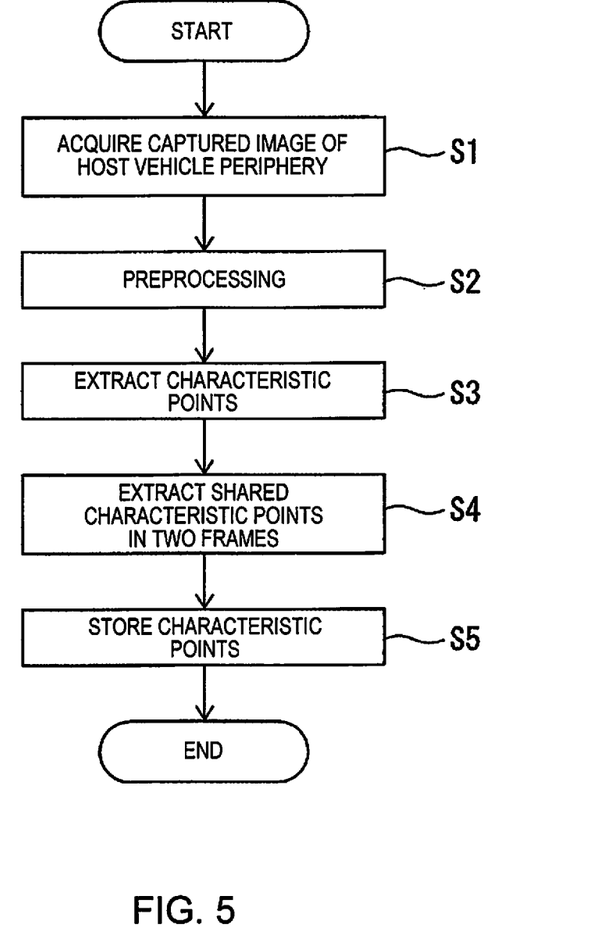
FIG. 5 is a flowchart of an example of processing for storing the feature learning position.

FIG. 5 is a flowchart of an example of a process for storing the feature learning position. When the feature learning position is to be stored in the storage device 21, the driver operates the parking position learning switch and parks the host vehicle 1 in the target parking position by manual driving.

In step S1, the image conversion unit 42 acquires a periphery image by converting the image captured by the camera of the external sensor 14 to a bird's eye view image as seen from a virtual viewpoint directly above the host vehicle 1.

In step S2, the characteristic point detection unit 44 performs predetermined preprocessing such as noise removal, brightness adjustment, and edge enhancement on the periphery image outputted from the image conversion unit 42.

In step S3, the characteristic point detection unit 44 detects characteristic points from the preprocessed periphery image.

In step S4, the characteristic point detection unit 44 extracts shared characteristic points shared between two different frames.

In step S5, the map generation unit 45 stores, in the storage device 21, the characteristic points extracted in step S4.

Figure 6:
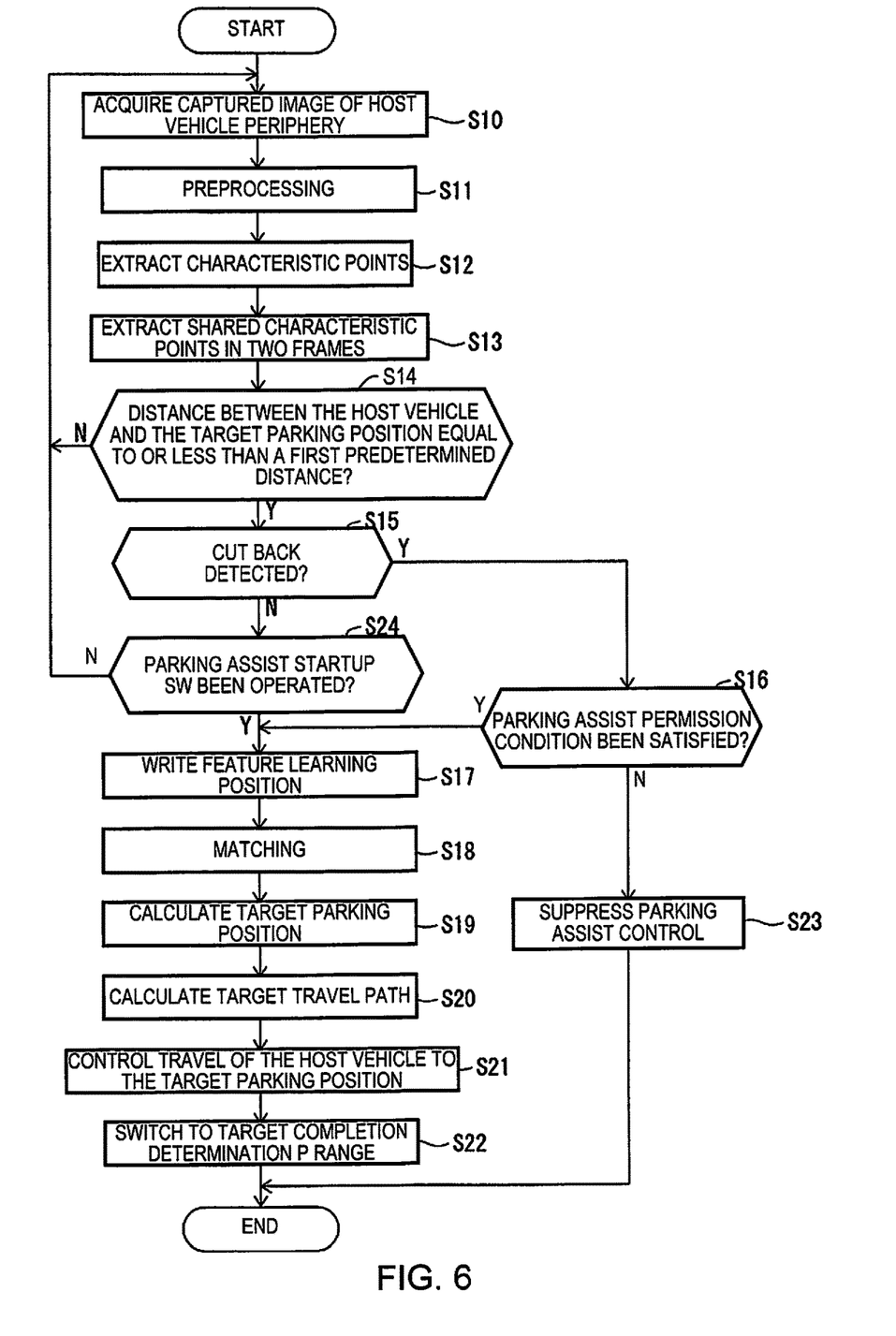
FIG. 6 is a flowchart of an example of processing during performance of parking assist.

FIG. 6 is a flowchart of an example of processing during performance of parking assist.

In step S10, the image conversion unit 42 acquires a periphery image.

In step S11, the characteristic point detection unit 44 performs predetermined preprocessing on the periphery image outputted from the image conversion unit 42.

In step S12, characteristic points are detected from the preprocessed periphery image.

In step S13, the characteristic point detection unit 44 extracts shared characteristic points shared between two different frames.

In step S14, the parking assist control unit 41 determines whether the distance between the host vehicle 1 and the target parking position 30 is equal to or less than the first predetermined distance. The process proceeds to step S15 when the distance between the host vehicle 1 and the target parking position 30 is equal to or less than the first predetermined distance (step S14: Yes). The process returns to step S10 when the distance between the host vehicle 1 and the target parking position 30 is not equal to or less than the first predetermined distance (step S14: N).

In step S15, the parking assist control unit 41 determines whether a shift operation for a cut back has been detected. Processing proceeds to step S16 when a shift operation for a cut back has been detected (step S15: Y). Processing proceeds to step S24 when a shift operation for a cut back is not detected (step S15: N).

In step S16, the parking assist control unit 41 determines whether the parking assist permission condition is satisfied. The process proceeds to step S17 when the parking assist permission condition is satisfied (step S16: Y). The process proceeds to step S23 when the parking assist permission condition is not satisfied (step S16: N).

In step S17, the matching unit 47 reads the characteristic points stored as feature learning positions in the map data 46.

In step S18, the matching unit 47 matches the characteristic points extracted in step S13 and the characteristic points read in step S17.

In step S19, the matching unit 47 calculates the target parking position 30 on the basis of the matched characteristic points.

In step S20, the target path generation unit 48 calculates the target travel path from the current position of the host vehicle 1 to the target parking position 30, and the target vehicle speed profile in which the host vehicle 1 travels along the target travel path.

In step S21, the steering control unit 49 controls the steering actuator 18a so that the host vehicle 1 travels along the target travel path. he vehicle speed control unit 50 controls the accelerator actuator 18b and the brake actuator 18c so that the vehicle speed of the host vehicle 1 changes in accordance with the target vehicle speed profile.

In step S22, the parking assist control unit 41 determines whether the parking assist control has concluded. When the parking assist control has concluded, the parking assist control unit 41 actuates the parking brake 17 and switches the shift position to the P range. Processing is then ended.

In step S16, when the parking assist permission condition is not satisfied (step S16: N), in step S23 the parking assist control unit 41 suppresses the parking assist control. The process then ends.

In step S15, when a shift operation for switching direction is not detected (step S15: N), in step S24 the parking assist control unit 41 determines whether the parking assist startup switch has been operated by the driver. When the parking assist startup switch has been operated (step S24: Y), the process proceeds to step S17 and parking assist control is executed. When the parking assist startup switch has not been operated (step S24: N), the process returns to step S10.

Effect of the Embodiments (1) The controller 16 detects a self-position, which is a current position of a host vehicle, calculates a target travel path from the self-position to a target parking position, determines whether a distance between the self-position and the target parking position is equal to or less than a first predetermined distance, determines whether a parking assist permission condition is satisfied, said parking assist permission condition being either a condition in which a predetermined time or longer has elapsed since the host vehicle departed from the target parking position, or a condition in which the distance between the self-position and the target parking position since the vehicle departed from the target parking position exceeds a second predetermined distance that is equal to or less than the first predetermined distance, performs parking assist control of the host vehicle based on the target travel path when the distance between the self-position and the target parking position is determined to be equal to or less than the first predetermined distance and the parking assist permission condition is satisfied, and suppresses the parking assist control when the parking assist permission condition is not satisfied even when the distance between the self-position and the target parking position is equal to or less than the first predetermined distance.

It is thereby possible to both achieve convenience of automatically starting parking assist when the host vehicle approaches a parking space, and suppress parking assist control unintended by the driver immediately after departure from a parking space.

(2) With the fact that the shift lever position is in the reverse range being added to the conditions for performing parking assist control, parking assist control can be performed when the distance between the self-position and the target parking position is determined to be equal to or less than the first predetermined distance and the parking assist permission condition is satisfied, and when a shift lever position is in a reverse range. Parking assist control unintended by the driver can thereby be more suitably prevented.

(3) The controller 16 can perform the parking assist control by controlling the host vehicle 1 so as to travel along the target travel path. When the parking assist permission condition is not satisfied, the parking assist control can be suppressed by reducing a speed of the host vehicle 1, which is caused to travel along the target travel path, to a greater extent than when the parking assist permission condition is satisfied. When unintended parking assist control has started, the driver can thereby cancel the continuation of unintended parking assist control at a stage when the movement distance of the vehicle by the parking assist control is short by, inter alia, operating, e.g., a brake. Alternatively, when the parking assist permission condition is not satisfied, the parking assist control can be prohibited. Parking assist control unintended by the driver can thereby be suppressed.

(4) The controller 16 can perform parking assist control by displaying the target travel path and the position of the host vehicle 1 on a display device visible to an occupant. When the parking assist permission condition is not satisfied, display of the target travel path and the position of the host vehicle 1 on the display device can be prohibited. Parking assist control unintended by the driver can thereby be suppressed.

All examples and conditional terms described herein are intended for illustrative purposes to aid the reader in understanding the present invention and concepts given by the inventors for the advancement of the technology, and are to be construed as not being limited to the above examples and conditions specifically described or to the configuration of the examples in the present specification relating to indications of the advantages and disadvantages of the present invention. Embodiments of the present invention have been described in detail, and it should be understood that various changes, substitutions, and modifications can be made thereto without departing from the spirit and scope of the present invention.

The invention claimed is:

1. A parking assist method comprising:
    detecting a self-position that is a current position of a host vehicle;
    calculating a target travel path from the self-position to a target parking position;
    determining a distance between the self-position and the target parking position;
    determining whether a shift operation for switching direction has been detected;
    determining whether a parking assist permission condition is satisfied, the parking assist permission condition being either a condition in which a predetermined time or longer has elapsed since the host vehicle departed from the target parking position, or a condition in which the distance between the self-position and the target parking position since the host vehicle departed from the target parking position exceeds a second predetermined distance that is equal to or less than a first predetermined distance;
    determining that the distance between the self-position and the target parking position is equal to or less than the first predetermined distance, determining that the parking assist permission condition is satisfied, and determining that the shift operation for switching direction has been detected, performing the parking assist control of the host vehicle based on the target travel path upon determining that the distance between the self-position and the target parking position is equal to or less than the first predetermined distance, upon determining that the parking assist permission condition is satisfied, and upon determining that the shift operation for switching direction has been detected; and
    determining that the parking assist permission condition is not satisfied, determining that the distance between the self-position and the target parking position is equal to or less than the first predetermined distance, and determining that the shift operation for switching direction is detected, suppressing the parking assist control upon determining that the parking assist permission condition is not satisfied even upon determining that the distance between the self-position and the target parking position is equal to or less than the first predetermined distance and upon determining that the shift operation for switching direction is detected.

2. The parking assist method according to claim 1, wherein
    the parking assist control controls the host vehicle so as to travel along the target travel path.

3. The parking assist method according to claim 2, wherein
    upon determining that the parking assist permission condition is not satisfied, the parking assist control reduces a speed of the host vehicle traveling along the target travel path to a greater extent than when the parking assist permission condition is satisfied.

4. The parking assist method according to claim 3, wherein
    the parking assist control is prohibited upon determining that the parking assist permission condition is not satisfied.

5. The parking assist method according to claim 1, wherein
    the parking assist control displays the target travel path and the position of the host vehicle on a display device that is visible to an occupant.

6. The parking assist method according to claim 5, wherein
    displaying of the target travel path and the position of the host vehicle on the display device is prohibited upon determining that the parking assist permission condition is not satisfied.

7. A parking assist device comprising:
    a sensor or positioning device configured to detect a self-position that is a current position of a host vehicle; and
    a controller configured to:
    calculate a target travel path from the self-position to a target parking position;
    determine a distance between the self-position and the target parking position;
    determine a distance between the self-position and the target parking position;
    determine whether a shift operation for switching direction has been detected;
    determine whether a parking assist permission condition is satisfied, the parking assist permission condition being either a condition in which a predetermined time or longer has elapsed since the host vehicle departed from the target parking position, or a condition in which the distance between the self-position and the target parking position since the host vehicle departed from the target parking position exceeds a second predetermined distance that is equal to or less than a first predetermined distance;
    determine that the distance between the self-position and the target parking position is equal to or less than the first predetermined distance, determine that the parking assist permission condition is satisfied, and determine that the shift operation for switching direction has been detected, performing the parking assist control of the host vehicle based on the target travel path upon determining that the distance between the self-position and the target parking position is equal to or less than the first predetermined distance, upon determining that the parking assist permission condition is satisfied, and upon determining that the shift operation for switching direction has been detected; and
    determine that the parking assist permission condition is not satisfied, determine that the distance between the self-position and the target parking position is equal to or less than the first predetermined distance, and determine that the shift operation for switching direction is detected, suppressing the parking assist control upon determining that the parking assist permission condition is not satisfied even upon determining that the distance between the self-position and the target parking position is equal to or less than the first predetermined distance and upon determining that the shift operation for switching direction is detected.

* * * * *